US012669369B2

(12) United States Patent
Hu et al.

(10) Patent No.: US 12,669,369 B2
(45) Date of Patent: Jun. 30, 2026

(54) MULTI-BAND DAS WITH ENHANCED SNR, INCREASED SAMPLING RATE AND MINIMIZED INTER-LOCATION INTERFERENCE

(71) Applicant: NEC Laboratories America, Inc., Princeton, NJ (US)

(72) Inventors: Junqiang Hu, Davis, CA (US); Yue-Kai Huang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 322 days.

(21) Appl. No.: 18/320,992

(22) Filed: May 21, 2023

(65) Prior Publication Data

US 2023/0375398 A1    Nov. 23, 2023

Related U.S. Application Data

(60) Provisional application No. 63/344,102, filed on May 20, 2022.

(51) Int. Cl.
 *G01H 9/00*     (2006.01)
 *H04B 10/2507*     (2013.01)

(52) U.S. Cl.
 CPC ......... *G01H 9/004* (2013.01); *H04B 10/2507* (2013.01)

(58) Field of Classification Search
 CPC .......... G01H 9/004; G01H 9/00; G01H 9/006; G01H 17/00; H04B 10/2537
 See application file for complete search history.

(56) References Cited

U.S. PATENT DOCUMENTS

2020/0370948 A1* 11/2020 Huang .................. G01H 9/004

FOREIGN PATENT DOCUMENTS

CN    101729482 A * 6/2010
WO    WO-2022076836 A1 * 4/2022  ........ G01M 11/3145

OTHER PUBLICATIONS

CN_101729482_A (English Translation) (Year: 2010).*

* cited by examiner

*Primary Examiner* — Thomas A Hollweg
*Assistant Examiner* — Mary A El-Shammaa
(74) *Attorney, Agent, or Firm* — Vincent Duffy

(57)    ABSTRACT

A distributed acoustic sensing (DAS) system that collects many frequency bands within the system (in particular, analog to digital converter, or ADC) bandwidth. The bands are divided into multiple groups, and within each group, the inter-band interference from band i to band j is at least $l_1$ dB lower than the power of band j. For different groups, the inter-band interference is at least $l_2$ dB lower than the power of band j, that $l_2 \geq l_1 + C_l$, where $C_l$ is a value related to round-trip fiber loss. The bands belonging to the same group are cascaded one after another, with little guard time in between, or packed back-to-back. This arrangement advantageously increases the overall signal power, resulting in an improved SNR.

5 Claims, 13 Drawing Sheets

Carver driving signal

RF signal re-shaped by a window function

MULTI-BAND DAS WITH ENHANCED SNR, INCREASED SAMPLING RATE AND MINIMIZED INTER-LOCATION INTERFERENCE

CROSS-REFERENCE TO RELATED APPLICATIONS

This application claims the benefit of U.S. Provisional Patent application Ser. No. 63/344,102 filed May 20, 2022, the entire contents of which is incorporated by reference as if set forth at length herein. This application is related to U.S. patent application Ser. No. 17/506,471 and U.S. patent application Ser. No. 16/783,119 the entire contents of each of which are incorporated by reference herein as if set forth at length.

FIELD OF THE INVENTION

This application relates generally to distributed fiber optic sensing (DFOS) systems, methods, structures, and related technologies. More particularly, it pertains to a multi-band distributed acoustic sensing (DAS) with enhanced signal-to-noise (SNR), increased sampling rate, and minimized inter-location interference.

BACKGROUND OF THE INVENTION

Distributed fiber optic sensing (DFOS) technologies including Distributed Acoustic Sensing (DAS), Distributed Vibration Sensing (DVS), and Distributed Temperature Sensing (DTS) have proven themselves to be most useful for sensing acoustic events, vibrational events, and temperatures in a plethora of contemporary applications.

DAS systems use Rayleigh backscattering in an optical sensing fiber to detect strain changes in the optical sensing fiber. The strain changes so detected result from vibration and/or acoustic effects acting on the optical sensing fiber and the backscattered signals are indicative of those effects and their locations occurring along the entire length of the optical sensing fiber. As presently employed, DAS systems exhibit several limiting characteristics.

First, DAS uses a single pulse or a period of code as a "probe" signal to sense the activity at each location along the length of the optical sensing fiber, which is determined by the probe and backscattered signal's flight time. For this reason, a backscattered signal from a far end of the optical sensing fiber must be received before sending the next pulse or code. The time interval between two pulses/codes is called a "frame period" ($T_f$). The minimum value of $T_f$ is proportional to optical sensing fiber length, so the sensing frequency (i.e., pulse repetition rate) must be lowered for longer fiber reach. For example, a 5 km fiber may have 20 kHz sensing frequency, while for 50 km fiber it is only about 2 kHz. In most applications, higher sensing frequency is preferred to strengthen the signal of interest.

Second, Rayleigh DAS has only a small portion of signal backscattered at each location, so relatively, the signal to noise ratio (SNR) is low, especially when a scattering location is tens of kilometers away from the source of the probe signal pulse (interrogator).

Lastly, Rayleigh scattering is random. As a result, there are locations along the length of the optical sensing fiber for which a backscattered signal is very weak, thus causes blind spots, which is called fading. DAS is not able to detect activity from locations with Rayleigh fading.

There are some existing solutions that attempt to mitigate or solve the above-noted problems. Publications by Wang, Z.; Pan, Z.; Fang, Z.; Ye, Q.; Lu, B.; Cai, H.; and Qu, R., entitled "Ultra-broadband phase-sensitive optical time-domain reflectometry with a temporally sequenced multi-frequency source", that appeared in Opt. Lett. 2015, 40, 5192-5195; and D. Iida, K. Toge and T. Manabe, entitled "High-frequency distributed acoustic sensing faster than repetition limit with frequency-multiplexed phase-OTDR", which appeared in 2016 Optical Fiber Communications Conference and Exhibition (OFC), Anaheim, C A, 2016, pp. 1-3; employed use multi-frequency pulses that are equally spaced in time domain within a frame to increase the repetition rate.

Multi-frequency can also help reduce Rayleigh fading if the pulses are spaced wide enough in frequency domain. Besides multi-frequency pulse, Zhang, Y. X.; Fu, S. Y.; Chen, Y. S.; Ding, Z. W.; Shan, Y. Y.; Wang, F.; Chen, M. M.; Zhang, X. P.; and Meng, Z., in a paper entitled: "A visibility enhanced broadband phase-sensitive OTDR based on the UWFBG array and frequency-division-multiplexing", that appeared in Opt. Fiber Technol. 2019, 53, 101995, employed fiber that has embedded artificial microstructures to have fading-free sensing, while Chen, D.; Liu, Q.; Fan, X.; and He, Z., in a paper entitled: "Distributed Fiber-Optic Acoustic Sensor with Enhanced Response Bandwidth and High Signal-to-Noise Ratio", that appeared in J. Light. Technol. 2017, 35, 2037-2043 employed frequency chirp to increase signal-to-noise ratio (SNR).

However, these approaches focus only on short-reach fiber sensing only, for example <10 km distance. For a system supporting 50 km of sensing range, consider 0.2 dB/km fiber loss, the received power difference from the beginning of the fiber vs the end of the fiber will be 20 dB. This level of power difference makes the system susceptible to harmonic frequency interference or spectrum leakage. Consider a fiber with signal's round-trip time $T_r$, frame period $T_f$ using 4 frequency bands with pulse interval $T_f/4$, i.e., pulse of frequency #1 generated at 0, #2 generated at $T_f/4$, #3 at $T_f/2$, and #4 at $3*T_f/4$. Then at time $T_r$, the backscattered signal of frequency #1 from the end of the fiber, and signal of frequency #4 from location $(T_r-3*T_f/4)$ (in terms of round-trip flight time) are both detected at the interrogator. When $T_f=T_r$ it becomes frequency #4 from the ¼ location of the fiber and frequency #1 from the end of the fiber. For 50 km case, the two locations are 37.5 km away, with roughly 15 dB power difference. If frequency #4 has a harmonic or spectrum leak that falls at frequency #1, the interference will be 15 dB stronger than the harmonic level.

As a result, increasing SNR and acoustic signal's sampling rate, while properly managing interference caused by harmonic frequencies or spectrum leakage, is critical for a DAS system's performance and remains an unsolved problem.

SUMMARY OF THE INVENTION

The above problem is solved and an advance in the art is made according to aspects of the present disclosure directed to systems, methods, and structures including a multi-band distributed acoustic sensing (DAS) system with enhanced signal-to-noise (SNR), increased sampling rate, and minimized inter-location interference.

In sharp contrast to the prior art, our inventive DAS system packs many frequency bands within the system (in particular, analog to digital converter, or ADC) bandwidth. The bands are divided into multiple groups, and within each group, the inter-band interference from band i to band j is at least $l_1$ dB lower than the power of band j. For different groups, the inter-band interference is at least $l_2$ dB lower than the power of band j, that $l_2 \geq l_1 + C_l$, where $C_l$ is a value related to round-trip fiber loss.

The bands belonging to a same group are cascaded one after another, with little guard time in between, or packed back-to-back. This arrangement advantageously increases the overall signal power, resulting in an improved SNR. The different groups are interleaved equally in each frame, for uniform sampling, thereby increasing the rate.

The present invention uses an I-Q modulator (IQM) followed by an Acousto-Optic Modulator (AOM) to create multi-frequency interrogation pulses. Because signal discontinuity may cause leakage to adjacent bands, either when switching from one band to another, or by the sharp signal carving feature of the AOM, we advantageously apply a window function to each band to avoid the leakage.

As we shall describe further, our inventive systems and method employ a signal grouping method, that divides the bands with ultra-low interference to each other in different groups, while those with slightly higher interference in same group. Also, our inventive systems and methods employ a signal arrangement method, such that bands within each group are cascaded with little or no guard time, while those of different groups are interleaved equally within a frame. Finally, our inventive systems and methods apply a window function to the signal and align the window with the AOM carving pulse, to reduce spectrum leakage.

DETAILED DESCRIPTION OF THE INVENTION

Figure 1A:
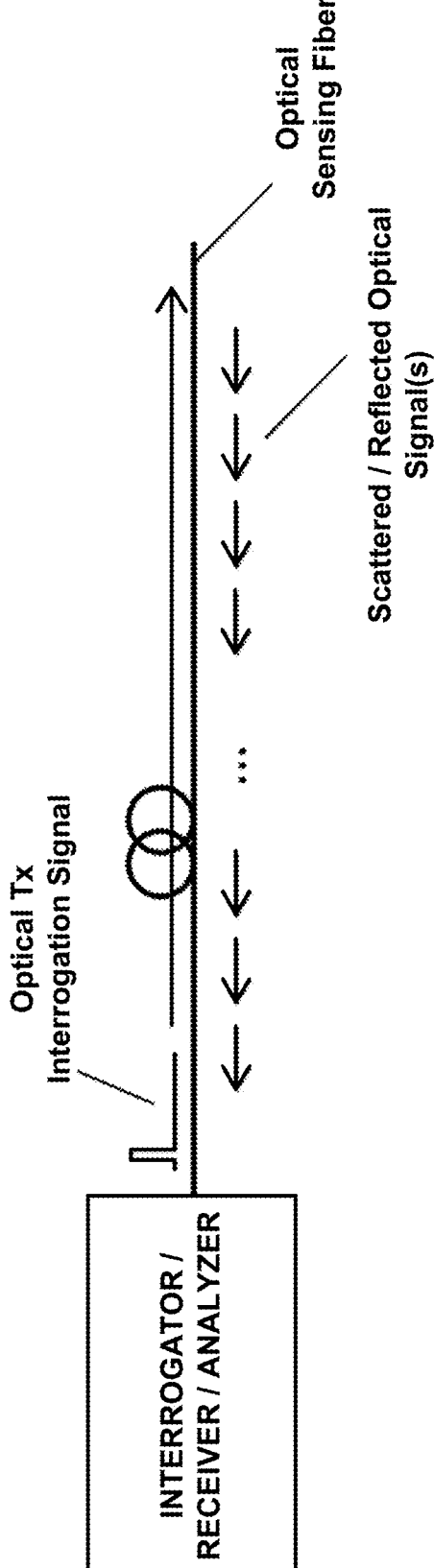
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
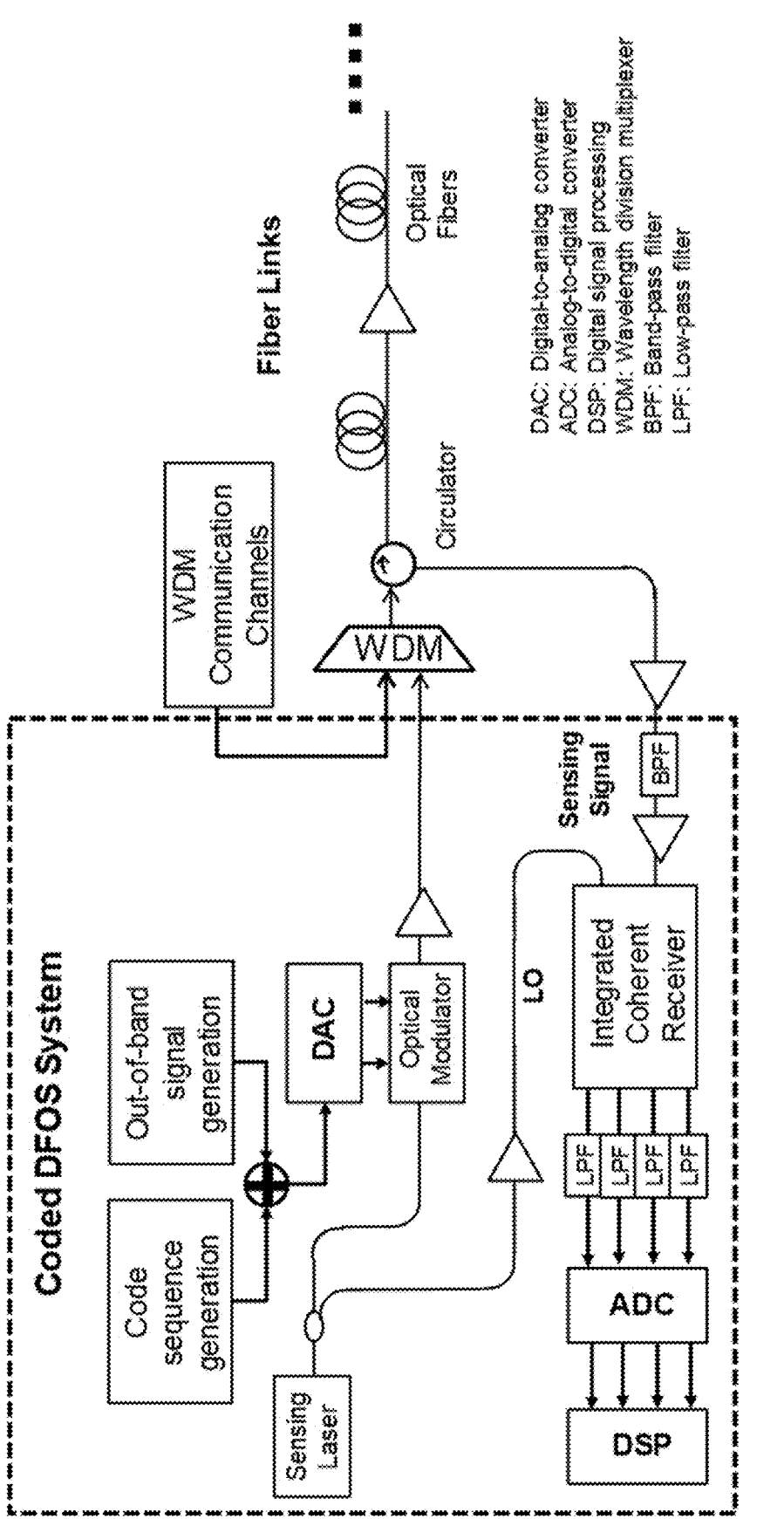

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Figure 2:
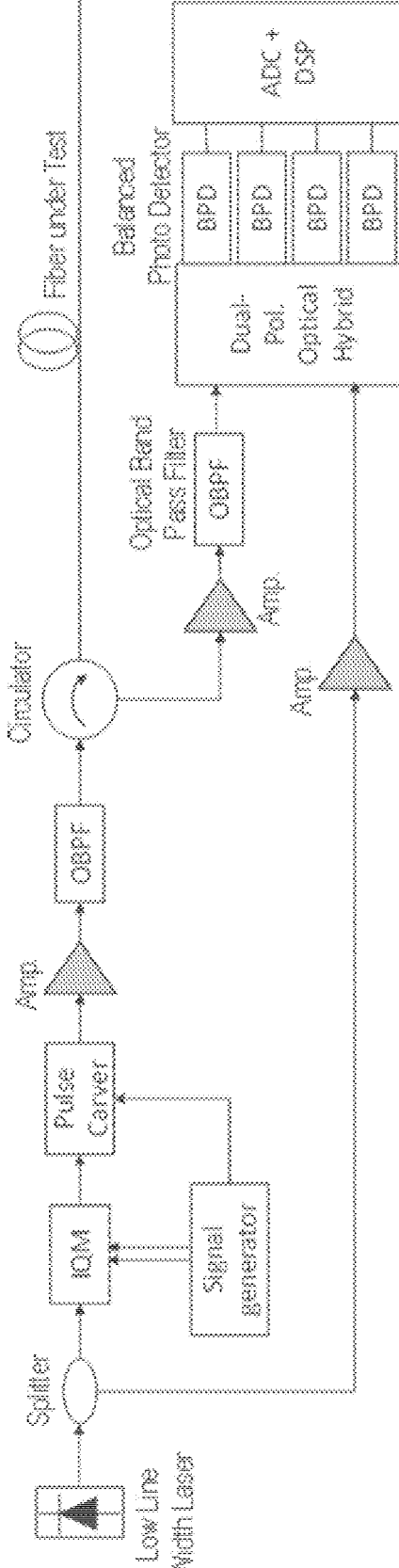
FIG. 2. Is a schematic diagram showing an illustrative architecture for a coherent DAS system according to aspects of the present disclosure.

FIG. 2. Is a schematic diagram showing an illustrative architecture for a coherent DAS system according to aspects of the present disclosure. This architecture has added in-phase/quadrature modulator (IQM) driven by a multi-band signal generator. A low linewidth laser as the source of the interrogating pulse and the coherent detection LOs. The two ports of the IQM are driven by multi-band signal source such as digital-to-analog converter (DAC) or other means. The signal generator synchronously drives a pulse carver such as AOM (Acousto-Optic Modulator) to output interrogating pulse with high extinction ratio. After amplification and optical filtering, the signal is sent to the fiber under test (FUT), with Raleigh backscattered signal directed to the coherent receiver by a circulator. The receiver side amplifies the received signal and detects using the standard method in dual-polarization coherent detection, then delivers the electrical signal to digitizer followed by DSP processing.

According to aspects of the present disclosure, our inventive systems and methods maximize the number of frequency bands that can be generated from the signal generator, while minimizing the interference from different locations. It evaluates the system's frequency response (in particular, the response of the signal generator), the grouping of signals, and the arrangement of the different bands to form a Tx frame. At the receiver side, it is also related to the bands' combining method, for increased SNR or sampling rate.

Figure 3:
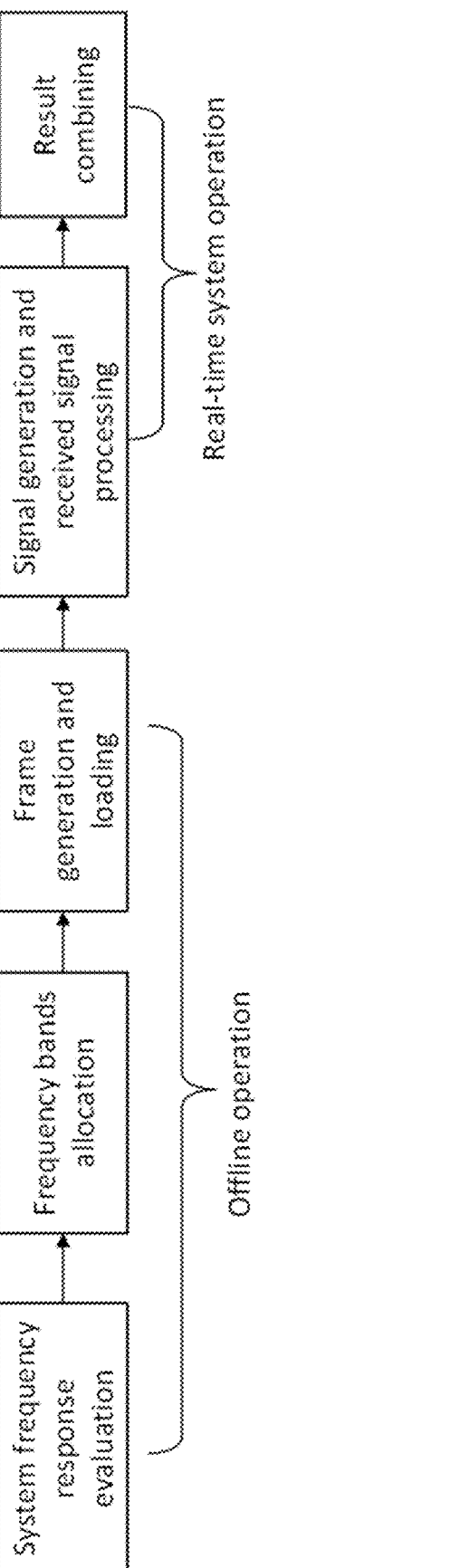
FIG. 3 is a schematic block diagram showing illustrative signal generation and system operation flow according to aspects of the present disclosure.

FIG. 3 is a schematic block diagram showing illustrative signal generation and system operation flow according to aspects of the present disclosure.

The Cause of Interference from Different Locations

Using multiple frequency bands in DAS has the advantage in reducing the Rayleigh fading, improving the system SNR, and increasing the sampling rate. However, if not designed carefully, the backscattered signal from one location may interfere with another.

Figure 4A:
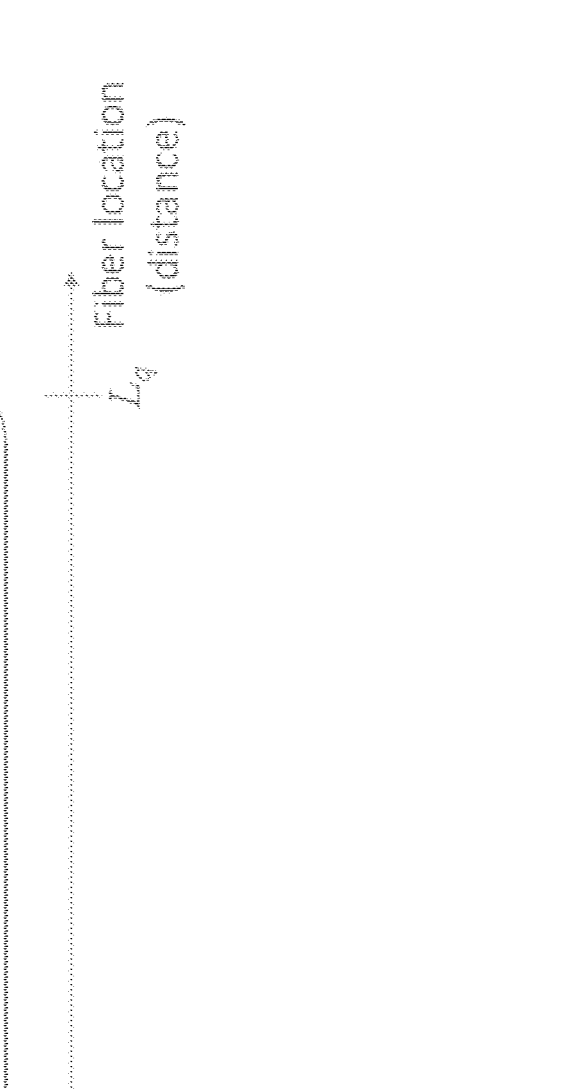
FIG. 4(A) and FIG. 4(B) are a pair of diagrams showing illustrative signal overlapping from different locations according to aspects of the present disclosure.
Figure 4B:
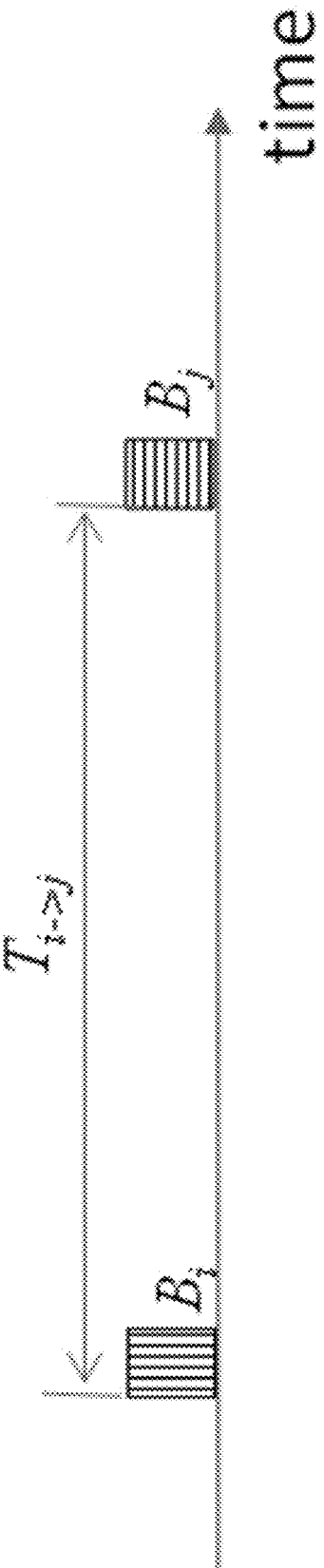

FIG. 4(A) and FIG. 4(B) are a pair of diagrams showing illustrative signal overlapping from different locations according to aspects of the present disclosure.

As the examples shown in FIG. 3(A), and FIG. 3(B) illustrate, if pulse $B_i$ to $B_j$ has latency of $T_{i \to j}$, that equals the round-trip signal flight time between locations $L_p$ and $L_q$, then signal $B_i$ from location $L_q$ overlaps with signal $B_j$ from location $L_p$. If there is spectrum leakage or harmonic frequency from $B_j$ to $B_i$, then the stimulus from $L_p$ will interfere with that of location $L_q$. When the distance between $L_p$ and $L_q$ is large, even very small interference from $L_p$ will be significant to $L_q$.

Multi-Band Arrangement

Figure 5A:
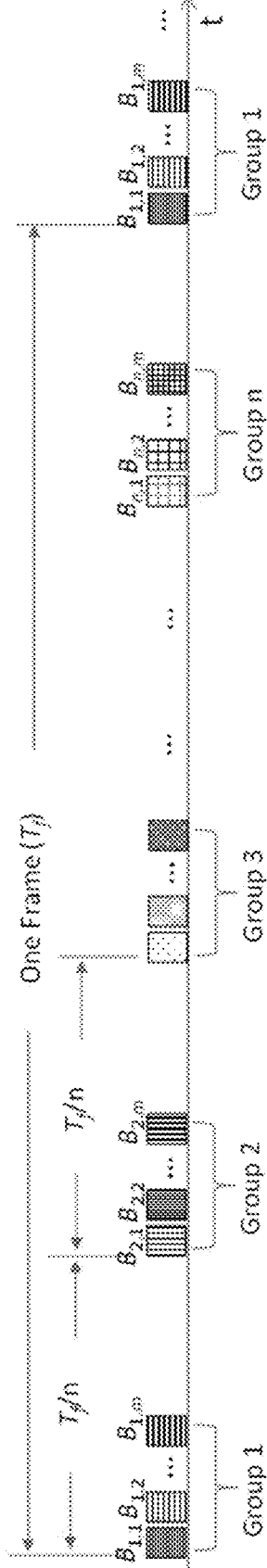
FIG. 5(A) and FIG. 5(B) are a pair of diagrams showing illustrative pulse band arrangements according to aspects of the present disclosure.
Figure 5B:
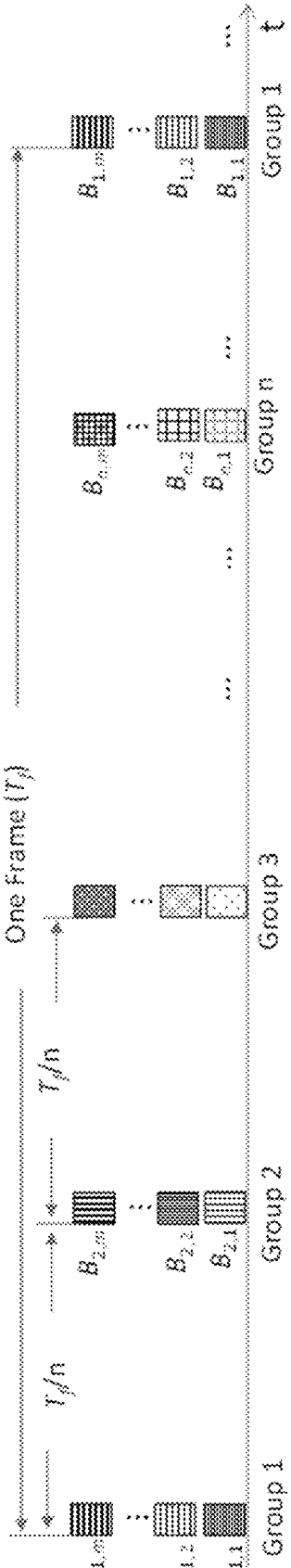

Systems and methods according to aspects of the present disclosure advantageously arrange the multi-band signal driving the IQM as illustrated in FIG. 5(A) and FIG. 5(B), which are a pair of diagrams showing illustrative pulse band arrangements according to aspects of the present disclosure. As illustrated in the figures, each RF band $B_{i,j}$ is either a single tone pulse, or a code with certain frequency shift. The RF bands are divided into multiple groups (group $1 \sim n$ as shown, or called subframes). Within each group, the RF bands $B_{i,j}$ (i for group number, and j for the band within the group) are arranged either in cascaded mode, with or without time gap in between, or in overlapped mode. Different groups are interleaved equally in each frame, with subframe period $T_f/n$ where $T_f$ is the duration of one frame. The method in FIG. 5(A) enables higher Tx power, while FIG. 5(B) has no interference constraint for the bands within each group, though both can reduce the Rayleigh fading.

Figure 6A:
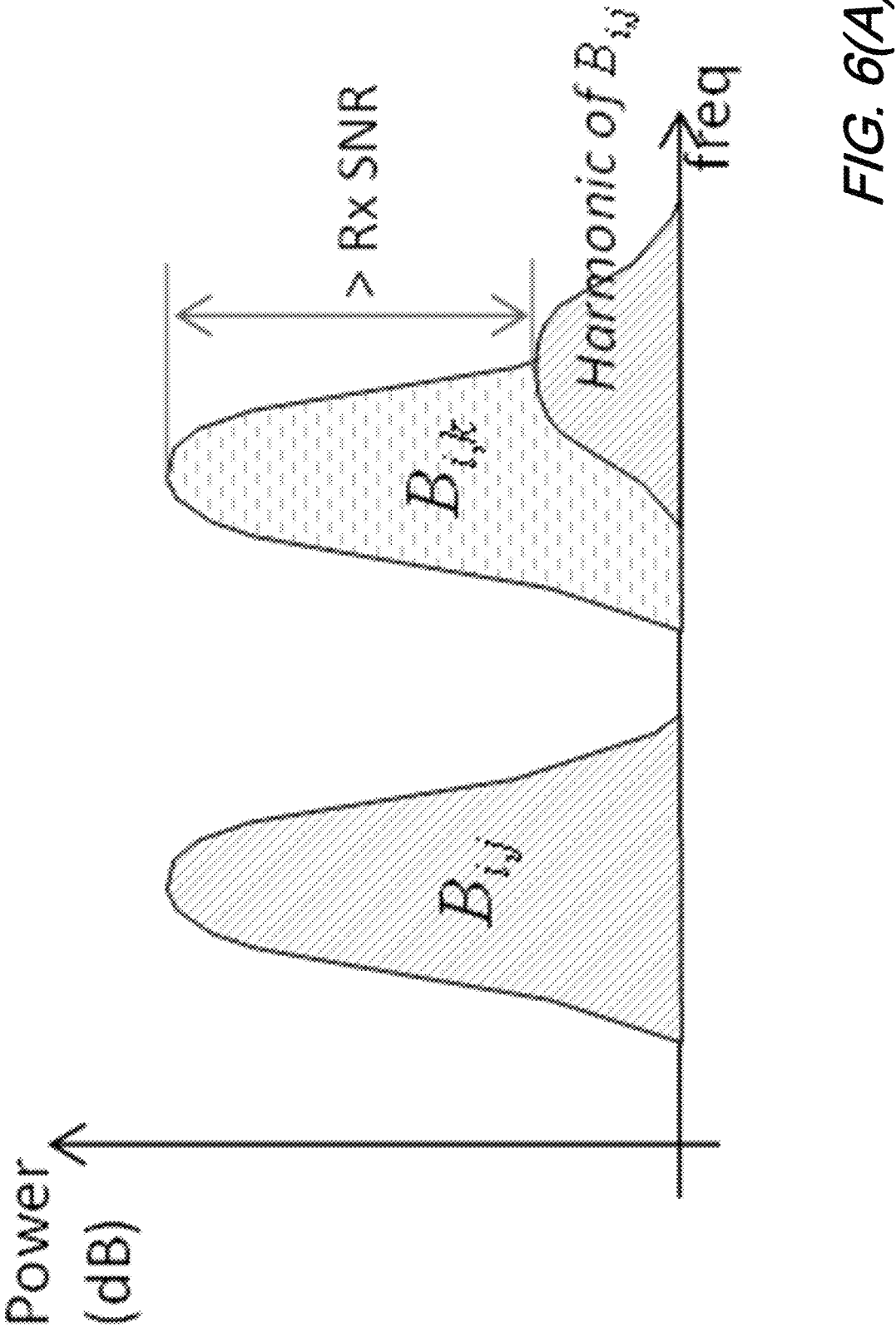
FIG. 6(A) and FIG. 6(B) are a pair of diagrams showing illustrative harmonic tolerance according to aspects of the present disclosure.
Figure 6B:
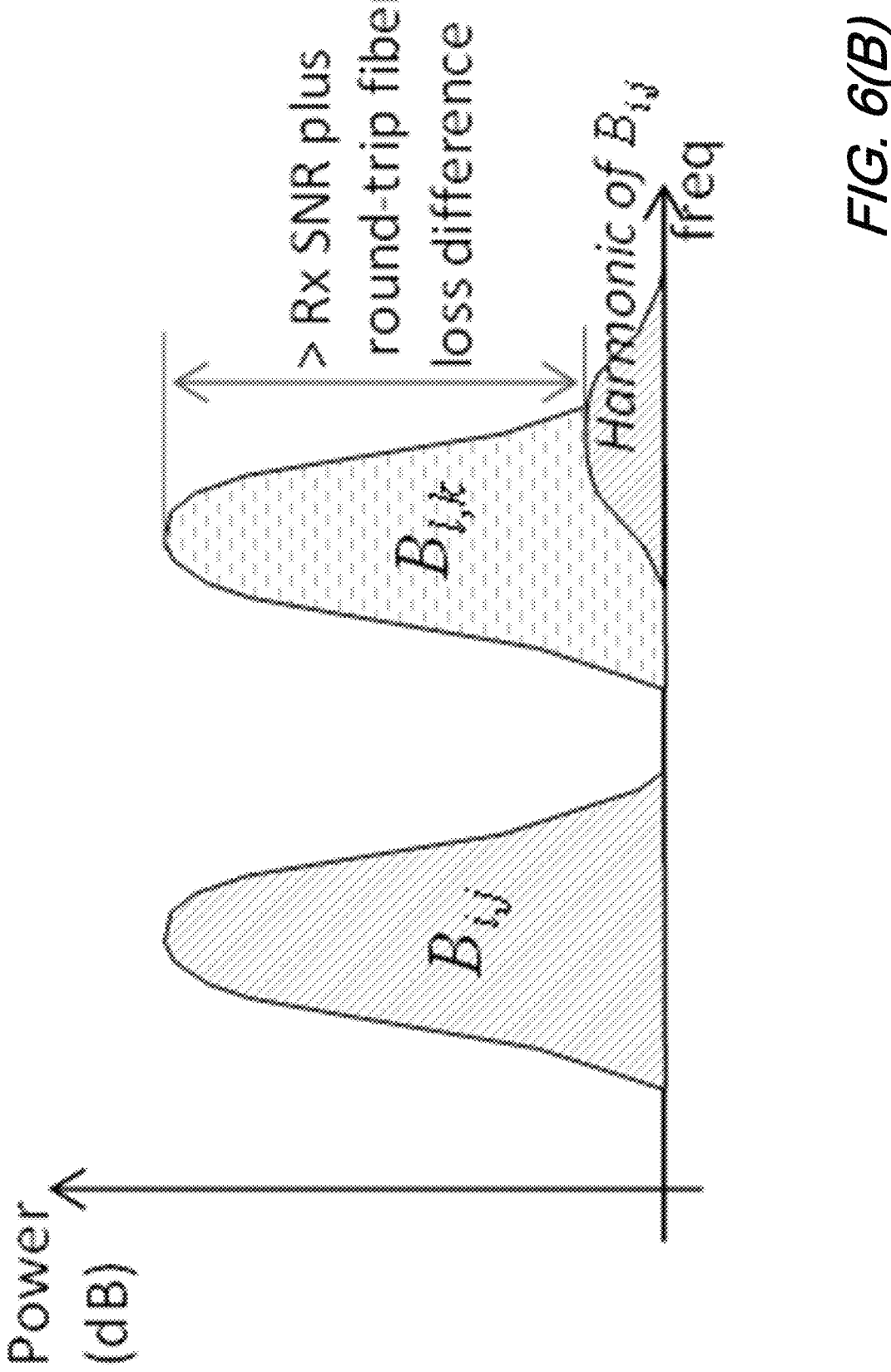

The bands within one group as in FIG. 5(A) may have harmonic or leakage spectrum overlapped with each other, if the harmonic or leakage power level is lower than the expected Rx SNR (FIG. 6(A)). For different groups, the harmonic/leakage spectrum needs to be further lower considering the round-trip fiber loss difference between overlapped locations ((FIG. 6(B)) FIG. 6(A) and FIG. 6(B) are a pair of diagrams showing illustrative harmonic tolerance according to aspects of the present disclosure.

Synchronized Carving Signal and Time-Domain Window Function

Figure 7A:
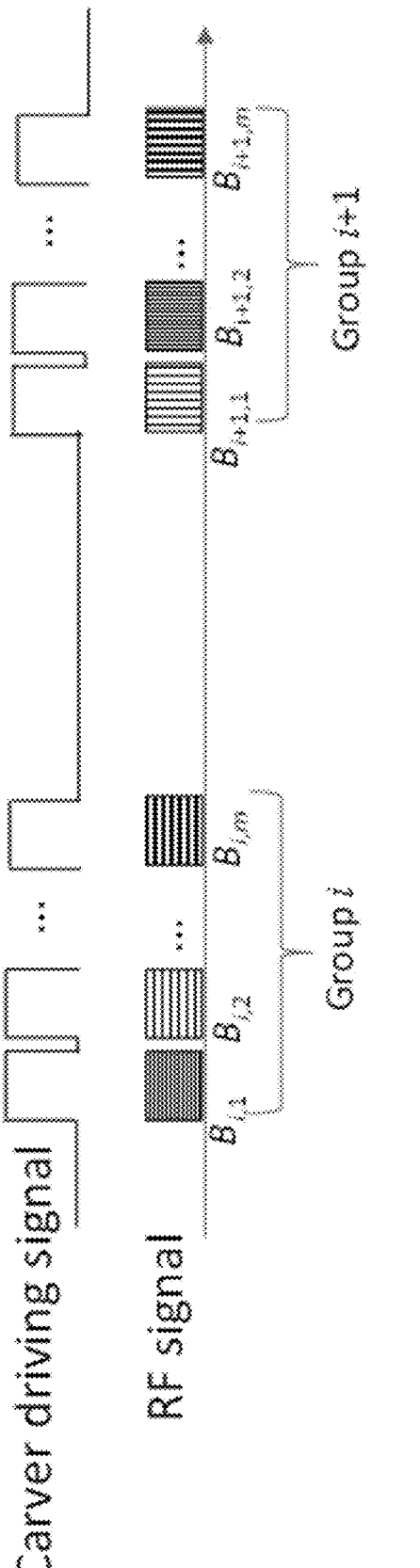
FIG. 7(A) and FIG. 7(B) are a pair of diagrams showing illustrative synchronization between pulse carver signal and RF bands according to aspects of the present disclosure.
Figure 7B:
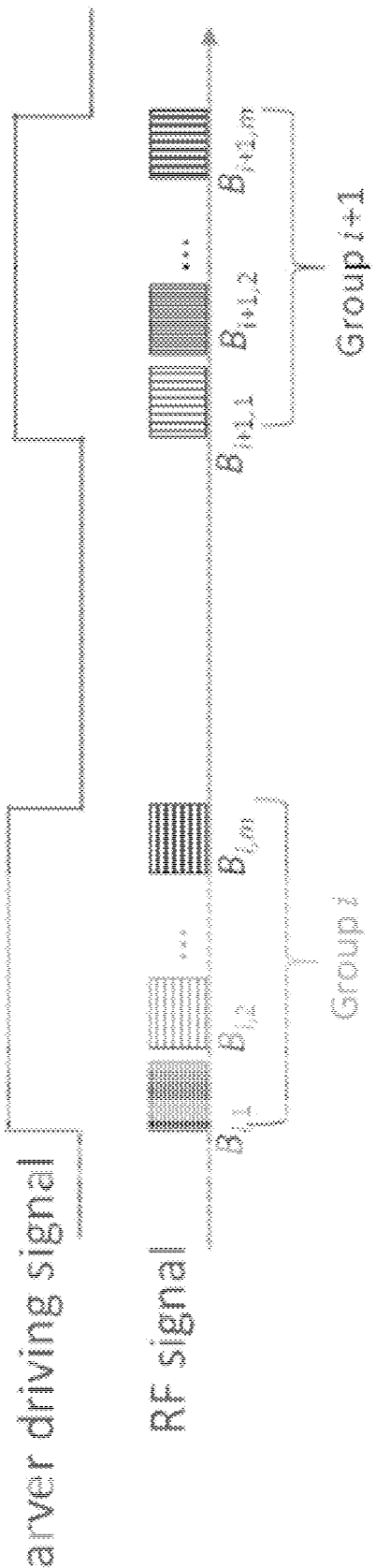

FIG. 7(A) and FIG. 7(B) are a pair of diagrams showing illustrative synchronization between pulse carver signal and RF bands according to aspects of the present disclosure. The signal driving the pulse carver is synchronized with each RF signal, either using one pulse to cover the signals in each subframe (FIG. 7(A)), or multiple pulses each covering one band.

Figure 8:
FIG. 8 is a diagram showing illustrative RF signal reshaping to avoid spectrum leakage according to aspects of the present disclosure.

To minimize the spectrum leakage, each RF band is reshaped by a window function, to have smooth transition from zero to peak power. The pulse carver driving signal covers the entire duration of this window. FIG. 8 is a diagram showing illustrative RF signal reshaping to avoid spectrum leakage according to aspects of the present disclosure.

Band Allocation

The nonlinearity from digital-to-analog conversion (DAC) and other electrical elements causes harmonic frequencies, which is a multiple of the original frequency. The harmonics can be reduced by applying non-linearity compensation but are difficult to completely remove. Spectrum leakage is mostly from the non-smooth transition in time domain. It can be reduced by applying a window function to the signal, and the interference can be avoided by giving sufficient guard frequency from neighboring bands. For this reason, it can be assumed that the interference from spectrum leakage is much lower than that from harmonic frequency. We use this observation to group and allocate the signal bands, using the following steps.

First, select a frequency range that has sufficient bandwidth to cover n bands plus a guard band in between each two, where n is the number of sub-frames. The guard band ensures the spectrum leakage meets the inter-group requirement. Let the lower and higher boundary of the selected frequency range be $F_l$ and $F_h$ respectively, then $F_h < 2*F_l$, to guarantee that the harmonic frequency does not fall in this group.

Second, from the generated signal spectrum of the existing allocations, identify the frequency range with harmonic and leaked power less than intra-group requirement. Within this frequency range, if there is harmonic spectrum that is higher than inter-group requirement, that harmonic spectrum is located in a group which generates this harmonic. The allocated bands are then distributed into different groups.

Finally, repeat the second step, above, for another band in each group.

Note that the band allocation in the above procedure must be in the DAC and ADC supported range. The usage of QM in the system makes both positive and negative spectrum applicable. Because of the non-perfect I-Q balancing, the "leakage" to the mirrored frequency can be treated like harmonic signal during the frequency band allocation.

Receiver Side Processing

At the receiver side, each band is first separated from the received signal, then converted to base band. The subsequent processing is like existing coherent DAS systems. Within each group, different bands are first aligned according to their delay in the original frame, then each band can be treated similar as different polarizations, so the polarization combining scheme can be applied. The results from different groups can be used for post-processing for each location.

At this point, while we have presented this disclosure using some specific examples, those skilled in the art will recognize that our teachings are not so limited. Accordingly, this disclosure should only be limited by the scope of the claims attached hereto.

The invention claimed is:

1. A multi-band distributed fiber optic sensing (DFOS)/distributed acoustic sensing (DAS) method exhibiting enhanced signal-to-noise, increased sampling rate, and minimized inter-location interference, the method comprising:
generating a multi-band signal;
driving an I-Q modulator (IQM) followed by an acousto-optic modulator (AOM) with the multi-band signal to generate multi-frequency optical interrogation pulses, wherein a window function is applied to the multiband signal to minimize inter-location interference caused by harmonic frequencies or spectrum leakage;
introducing the multi-frequency optical interrogation pulses into a length of optical sensing fiber; and
receiving Rayleigh reflected signals from the optical sensing fiber with a coherent receiver configured to extract information from the reflected signals;
wherein each RF band of the multi-band signal is either a single tone pulse or a code having a certain frequency shift;
wherein a signal driving the AOM is synchronized with the multi-band signal.

2. The method of claim 1 wherein RF bands are divided into multiple groups and within each group, inter-band interference from a band i to a band j is at least $l_1$ dB lower than the power of band j.

3. The method of claim 2 wherein the different groups are interleaved equally in a frame, thereby creating a plurality of subframes.

4. The method of claim 3 wherein a signal driving an acousto-optic modulator (AOM) is synchronized with each RF signal of the multi-band signal, either using one pulse to cover signals in each subframe, or multiple pulses each covering one band.

5. The method of claim 4 wherein each RF band is reshaped by the window function such that it extends a smooth transition from zero to peak power to minimize spectrum leakage caused by non-smooth transitions in a time domain.

* * * * *